US007474595B2

(12) United States Patent
Aires et al.

(10) Patent No.: US 7,474,595 B2
(45) Date of Patent: Jan. 6, 2009

(54) METHOD FOR PREPARING A MULTIMEDIA STREAM

(75) Inventors: Kevin Barnaby Aires, Woking (GB); Andrew Gordon Neil Walter, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 873 days.

(21) Appl. No.: 10/992,512

(22) Filed: Nov. 18, 2004

(65) Prior Publication Data

US 2005/0138665 A1    Jun. 23, 2005

(30) Foreign Application Priority Data

Dec. 23, 2003    (GB)    ................................. 0329784.3

(51) Int. Cl.
*G11B 7/085*    (2006.01)
(52) U.S. Cl. ................... 369/30.06; 369/30.08; 725/87; 725/134
(58) Field of Classification Search .............. 369/30.06, 369/30.08, 30.38, 30.03; 386/46, 125; 725/87, 725/134, 46, 89; 348/E7.073
See application file for complete search history.

(56) References Cited

U.S. PATENT DOCUMENTS

2003/0154480 A1    8/2003    Goldthwaite et al. .......... 725/46

FOREIGN PATENT DOCUMENTS

| EP | 0875 0856 A1 | 11/1998 |
| EP | 1083568 A2 | 3/2001 |
| WO | WO 0131497 A1 | 5/2001 |

*Primary Examiner*—Ali Neyzari
(74) *Attorney, Agent, or Firm*—Stephen J. Walder, Jr.; Libby Z. Handelsman

(57) ABSTRACT

A method for preparing a first multimedia stream, for use with an environment comprising a repository for storing a plurality of tracks. Each track may be associated with at least one second multimedia stream. A track may comprise a single type of data (e.g., audio, video, etc.). The method may comprise receiving a request comprising an associated parameter (e.g., a position parameter) and determining at least two of the plurality of tracks associated with the parameter. The at least two tracks may have associated information that matches the position parameter. Responsive to the determining the at least two tracks, the determined at least two tracks may be collated in order to generate the first multimedia stream.

1 Claim, 6 Drawing Sheets

US 7,474,595 B2

METHOD FOR PREPARING A MULTIMEDIA STREAM

FIELD OF THE INVENTION

The present invention relates to a system for preparing a multimedia stream.

BACKGROUND OF THE INVENTION

Use of digital devices such as personal computers, personal digital assistants (PDAs), mobile telephones, digital cameras etc. has increased. These digital devices can capture digital data (e.g. audio data, video data, textual data etc.) and therefore the amount of digital data has also increased.

Digital data is diverse (e.g. digital data can be created according to several different formats) and to a user, the task of traversing the digital data can be very difficult and time-consuming.

Therefore there is a need to harness, organize and prepare this digital data so that a user can benefit from the data. U.S. patent application 2003/0154480 A1 details a mechanism to address this problem. The mechanism is a digital history service that has a first data store comprising multimedia files (including text, audio, video, etc.) and a second data store comprising schedule data (e.g. calendar data). The digital history service then correlates selected multimedia files from the first data store with selected schedule data from the second data store. Information indicative of the selected multimedia files is presented to the user. However, the mechanism does not add any value to the multimedia files that are retrieved. Thus, there is a need for an improved mechanism for multimedia preparation.

SUMMARY OF THE INVENTION

In one illustrative embodiment, a method of preparing a first multimedia stream, for use with an environment comprising a multimedia track repository for storing a plurality of tracks, each track being associated with at least one second multimedia stream, is provided. The method comprises receiving a request, from a requesting device, comprising an associated geographical location parameter and searching the multimedia track repository based on the geographical location parameter. The plurality of tracks in the multimedia track repository comprise position portions in which portions of the tracks are associated with geographical location information. The method further comprises determining at least two portions of the plurality of tracks associated with the geographical location parameter by comparing position information for portions of the plurality of tracks to the geographical location parameter and selecting the at least two portions of the plurality of tracks as portions of the plurality of tracks whose associated geographical location information matches the geographical location parameter within a specified geographical range.

In response to the determining the at least two portions of the plurality of tracks, the method collates the determined at least two portions of the plurality of tracks in order to generate the first multimedia stream. The method further returns the first multimedia stream to the requesting device. The requesting device outputs the first multimedia stream.

Determining the at least two portions of the plurality of tracks comprises generating, for each track in the plurality of tracks, a first bounding volume based on the position information for portions of the track and comparing the geographical location parameter to geographical location information associated with the first bounding volume to determine if the geographical location parameter is within the bounding volume or within the specified geographical range of the bounding volume. In response to the geographical location parameter being within the bounding volume, at least one second bounding volume is iteratively generated based on geographical location information for at least two of the portions of the track, the geographical location parameter is iteratively compared to geographical location information associated with the at least one second bounding volume to determine if the geographical location parameter is within the at least one second bounding volume, and portions of the track within the at least one second bounding volume are returned as results of determining the at least two portions of the plurality of tracks.

These and other features and advantages of the present invention will be described in, or will become apparent to those of ordinary skill in the art in view of, the following detailed description of the illustrative embodiments of the present invention.

BRIEF DESCRIPTION OF THE DRAWINGS

The present invention will now be described, by way of example only, with reference to preferred embodiments thereof, as illustrated in the following drawings.

DETAILED DESCRIPTION OF THE PREFERRED EMBODIMENT

Figure 1:
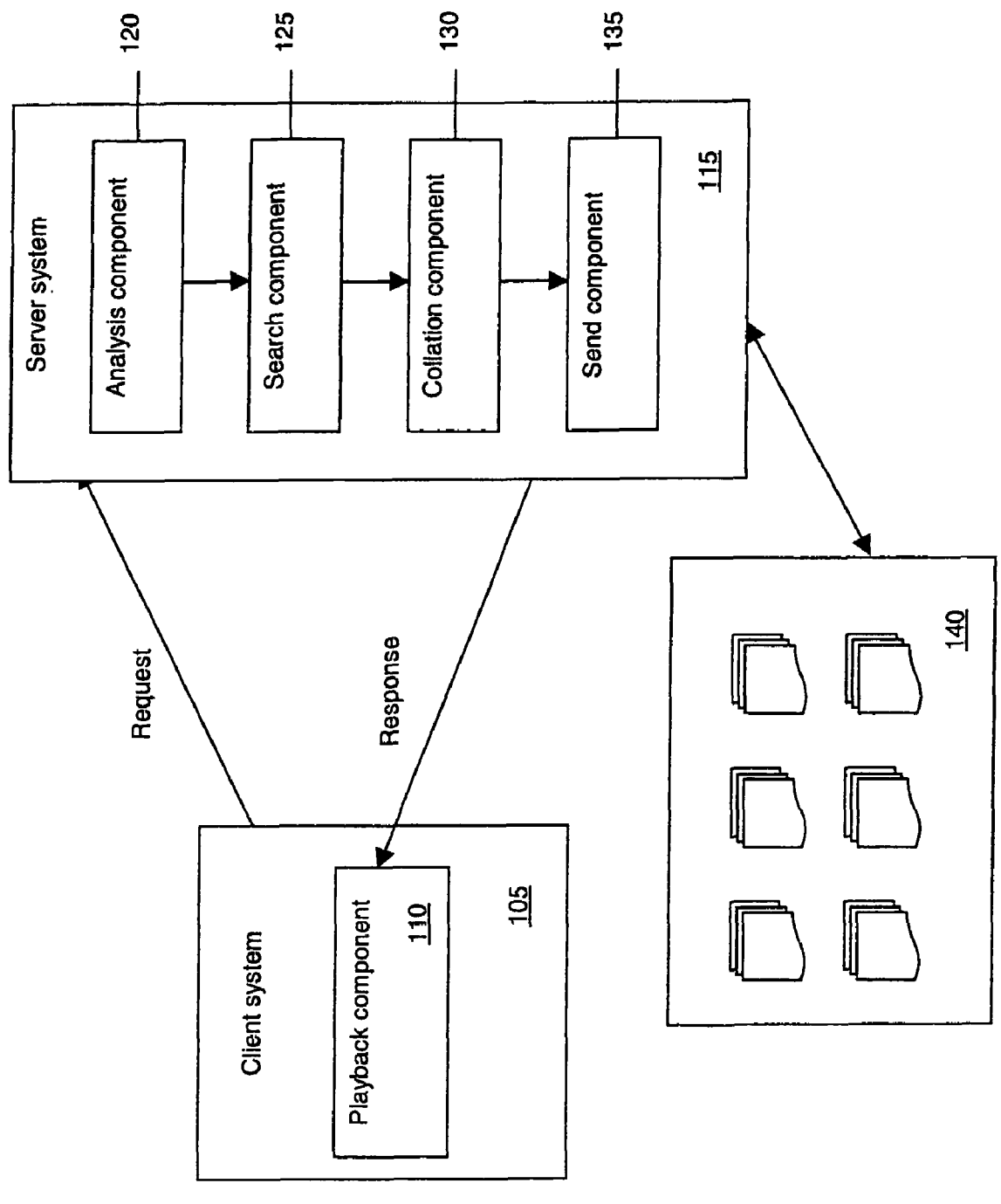
FIG. 1 is an overview of a system in which the present invention may be implemented.

A system (100) in which the present invention may be implemented is shown in FIG. 1. The system (100) comprises a client system (105) (e.g. a personal computer, a PDA, a mobile telephone etc.) having a playback component (110) which renders multimedia streams so that they can be "played back" on the client system (105). The system (100) also comprises a server system (115) comprising an analysis component (120), a search component (125), a collation component (130) and a send component (135). The system (100) also comprises a repository (140) comprising a plurality of tracks. It should be understood that in an alternative embodiment, the server system (115) can hold the repository (140) comprising a plurality of tracks.

A track is associated with a single type of data (e.g. audio, video, position, time etc.). A track comprises one or more portions of data. Each portion of a track may vary in size, for example, in a video track, a portion may comprise a single frame of video, a sequence of frames of video, the entire video track stored as a logical chunk of data etc. A multimedia stream comprises one or more tracks.

Figure 2A:
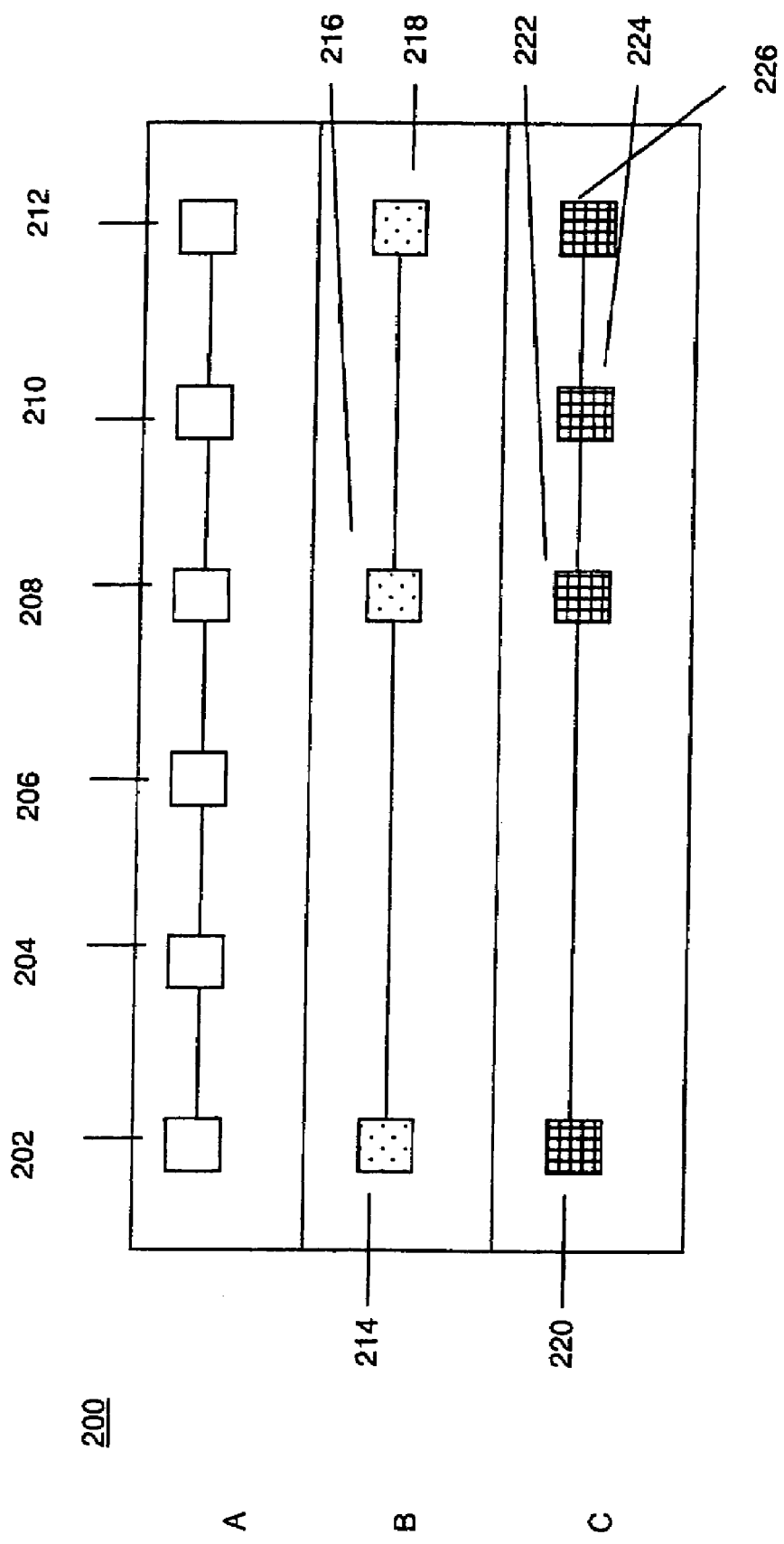
FIG. 2A is an overview of one multimedia stream, having associated tracks.

FIG. 2A is an overview diagram of a multimedia stream (200). Stream 200 comprises one first track (i.e. a video track A) and information associated with the first track, that is, two second tracks (i.e. a position track B and a time track C). Video track A comprises six portions (202-212), position track B comprises three portions (214-218) and time track C comprises four portions (220-226). Portion 214 represents a position (e.g. longitude, latitude) (i.e. xxx, xxx). Portion 216 represents a position (i.e. xxx, xxx). Portion 218 represents a position (i.e. yyy, yyy). Portion 220 represents a time value of 1998. Portion 222 represents a time value of 1998. Portion 224 represents a time value of 1998. Portion 226 represents a time value of 1998. The first track is associated with the two second tracks (e.g. by metadata that exists as part of the multimedia stream, which correlates portions of the first track with portions of the second tracks).

Figure 2B:
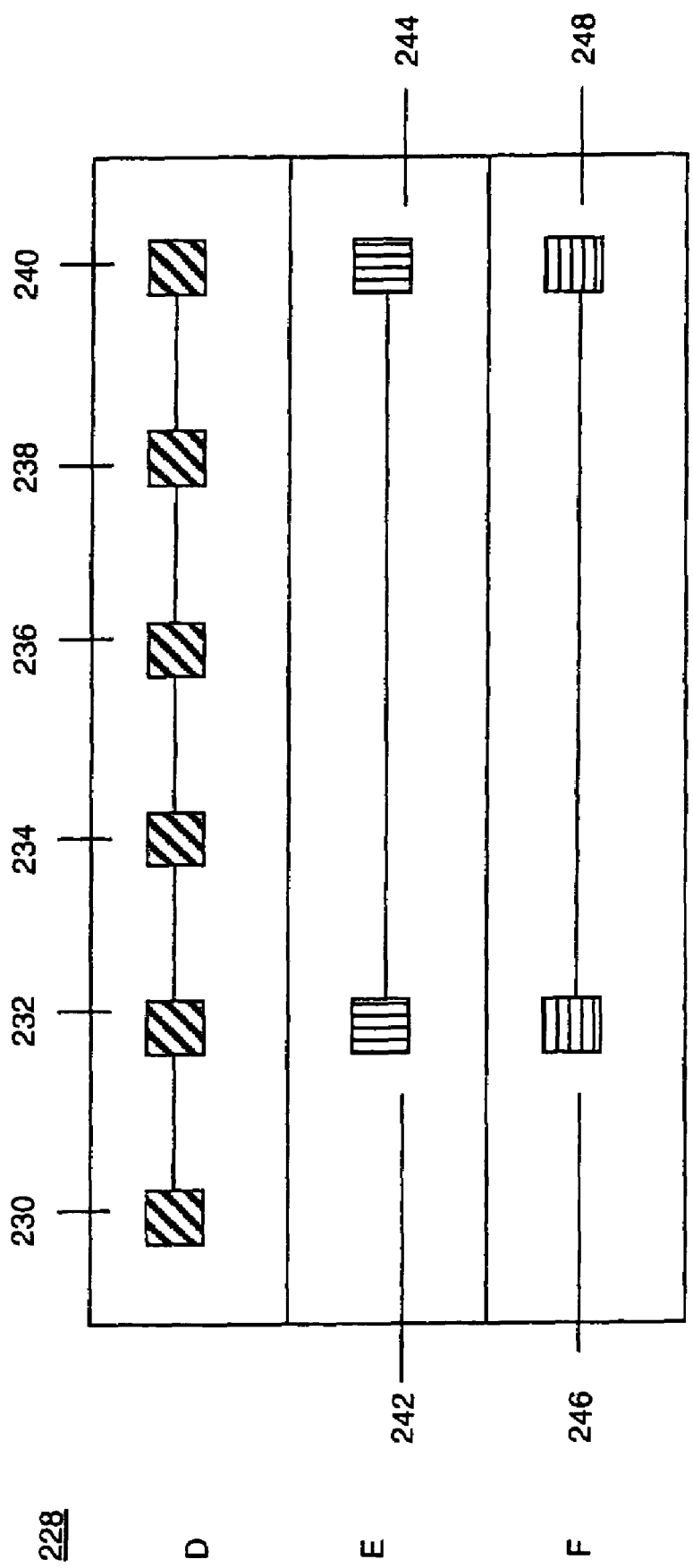
FIG. 2B is an overview of another multimedia stream, having associated tracks.

FIG. 2B is an overview diagram of another multimedia stream (228). Stream 228 comprises a first track (i.e. audio track D) and information associated with the first track, that is, two second tracks (i.e. a position track E and a time track F). Audio track D comprises six portions (230-240), position track E comprises two portions (242 and 244) and time track F comprises two portions (246 and 248). Portion 242 represents a position (i.e. xxx, xxx). Portion 244 represents a position (i.e. xxx, xxx). Portion 246 represents a time value of 1998. Portion 248 represents a time value of 1998.

One embodiment of a process of the present invention will now be described. Firstly, a user at the client system (105) makes a request. The request comprises an associated one or more parameters. In this example, the request comprises parameters representing a position (i.e. xxx, xxx—a position of the Taj Mahal) and a time value (i.e. 1998).

The request is sent to the server system (115), wherein the analysis component (120) receives the request and analyses it in order to determine the one or more parameters in the request. In one embodiment, the analysis component (120) parses the entire request in order to determine the one or more parameters in the request. In another embodiment, the analysis component (120) searches for headers in the request, wherein each header denotes the start of an parameter. In this example, the analysis component (120) determines two parameters in the request, namely a position of the Taj Mahal and a date, namely, 1998.

Figure 3:
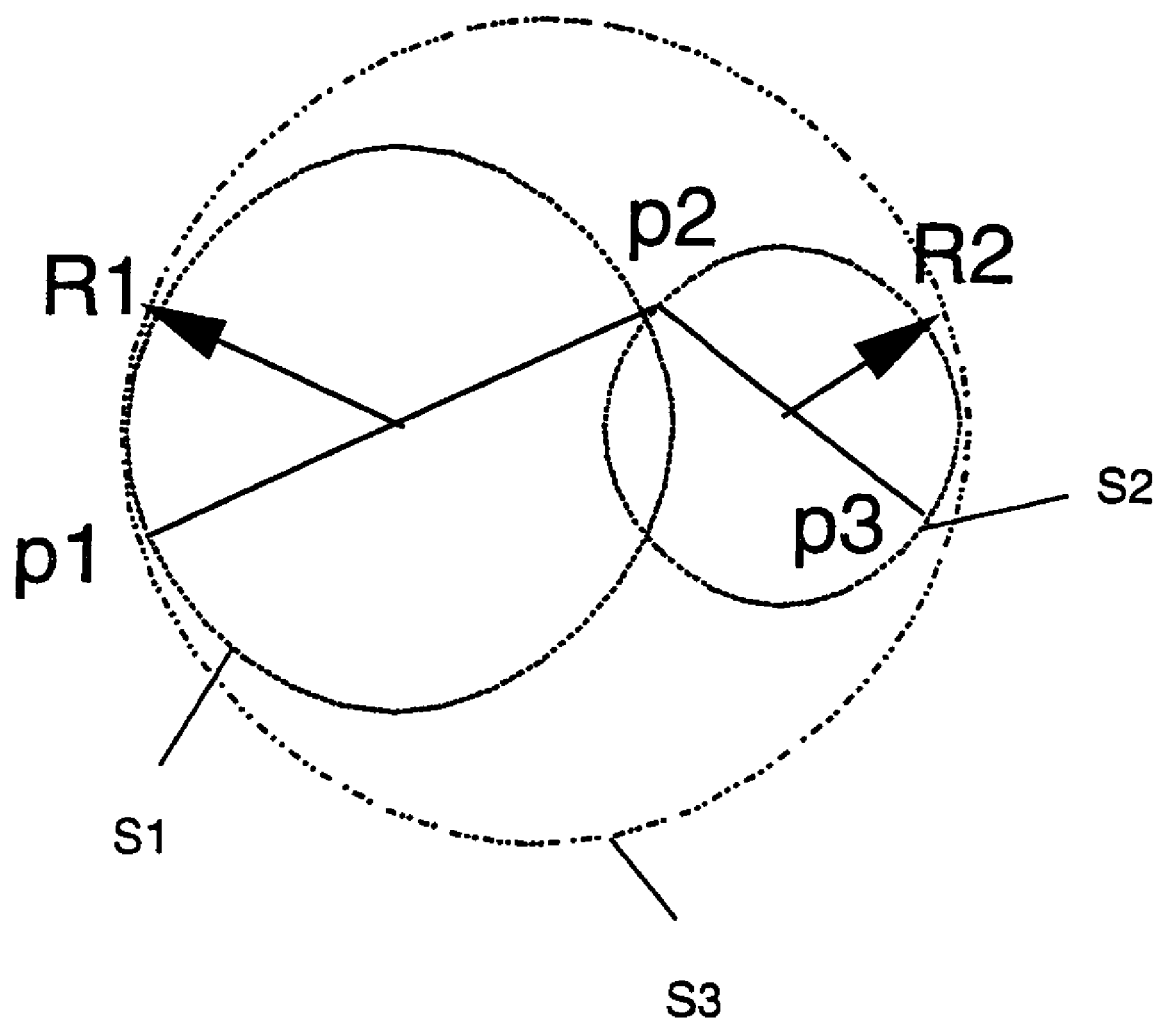
FIG. 3 is an overview of one example of an indexed track.
Figure 4:
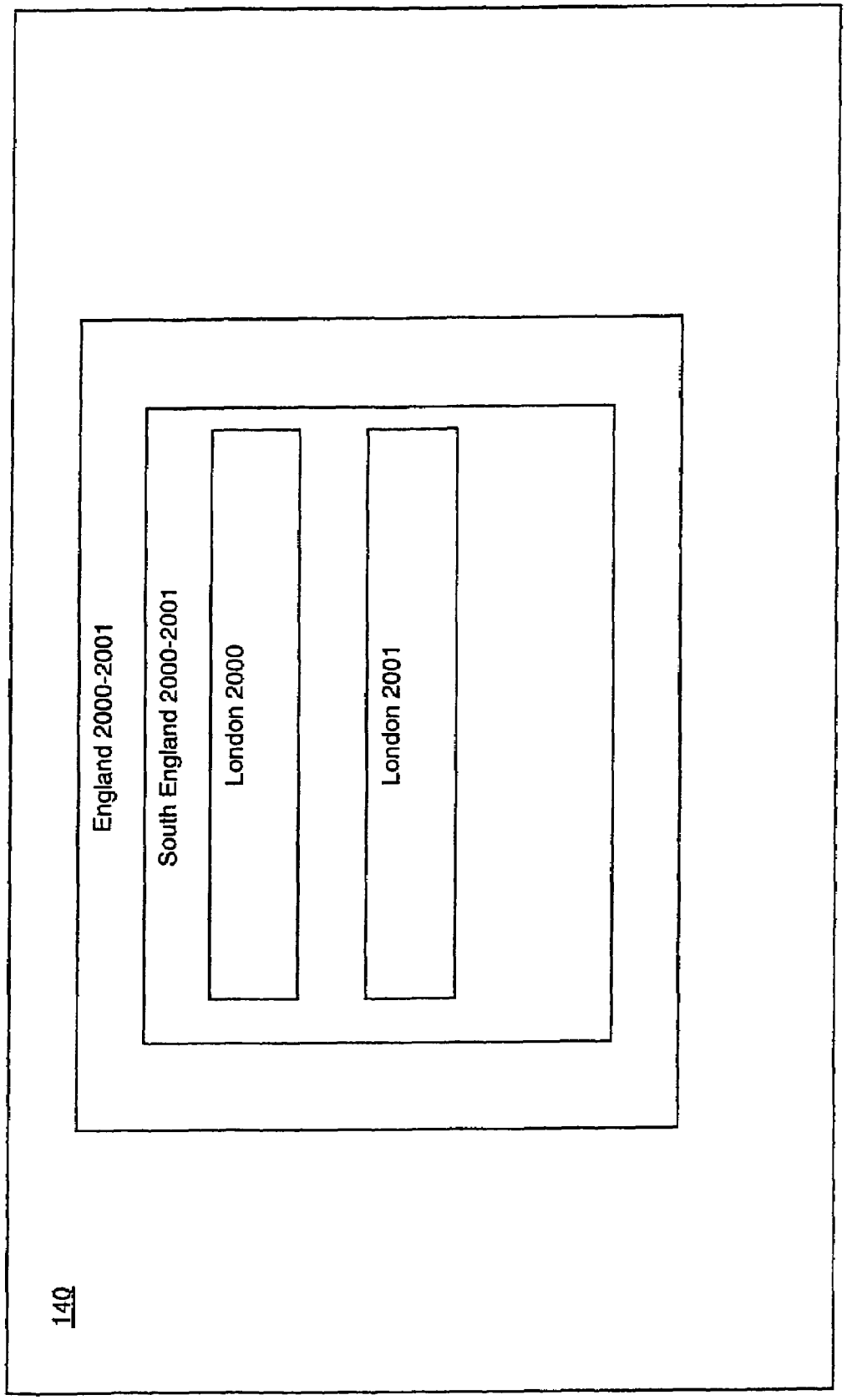
FIG. 4 is an overview of one example of an indexed repository.

In one embodiment, a track is indexed by using bounding volumes (e.g. spheres, cylinders, boxes etc.). Where only two dimensional information is available (e.g. x, y co-ordinates), the information in the third dimension (e.g. z co-ordinate) is left unconstrained, so that a two dimensional circle maps to a three dimensional cylinder with infinite height. In this example, a bounding sphere is used for position portions and is shown in FIG. 3. In this example, for position track B, portion 214 defines position 1, portion 216 defines position 2 and portion 218 defines position 3. The section from p1 to p2 comprises a total distance of 3 miles in Central London. The section from p2 to p3 comprises a total distance of 2 miles in Central London. As shown in FIG. 4, each section is bounded by a boundary sphere (i.e. S1 and S2), having a central co-ordinate and a diameter of 3 miles and 2 miles respectively. The boundary spheres are themselves bounded by a higher level boundary sphere, S3, having a diameter of approximately 5 miles.

The process of constructing bounding volumes is typically executed at the indexing stage and may be applied in an iterative or recursive manner, such that for a multimedia stream with position portions, it is possible to derive a single outermost boundary volume that comprises the entire route (approximately) of the multimedia stream.

In this embodiment, the analysis component (120) passes the request to the search component (125). Using the position portions as an example, when the position parameter representing a position of the Taj Mahal is received, the multimedia stream (200) is rejected because the top level bounding sphere (i.e. S3) has an associated position that is not near to the Taj Mahal. This is an efficient method of searching, because the lower level spheres (i.e. S1 and S2) did not have to be searched in order to reject the multimedia stream. In another example, when a request comprising a position of central London is received, the bounding sphere S3 is found. Next, the lower level bounding sphere S1 and S2 are also searched and relative associated portions are found.

In another embodiment, the analysis component (120) passes the two parameters in the request to the search component (125) and in this embodiment, the search component (125) uses the two parameters in the request in order to search the multimedia streams (200, 228) in the repository (140). More particularly, the search component (125) searches for video and audio portions in the multimedia streams having associated information (i.e. position and time portions) that match the parameters in the request.

In this embodiment, in the first multimedia stream (200), portion 202 and portion 208 have associated position portions (214, 216) and time portions (220, 222) that match the parameters in the request. In this example, in the second multimedia stream (228), portion 232 and portion 240 have associated position portions (242, 244) and time portions (246, 248) that match the parameters in the request.

In this example, the search component (125) has executed an exact search, wherein a found video or audio portion is associated with position and time portions that match the parameters in the request.

In another example, the search component (125) executes a partial search, wherein a found video or audio portion has some associated position and/or time portions that match the parameters in the request (e.g. a video portion is associated with a position portion representing a position of xxx, xxx, but has an associated time portion representing the year 2000 rather than 1998).

In yet another example, the search component (125) executes a similarity search, wherein a found video or audio portion is associated with position and/or time portions that are similar to the parameters in the request according to a pre-determined similarity factor. In a first example, a video portion is associated with a position portion representing a position of yyy, yyy that is near to the Taj Mahal with a similarity factor of within 20 miles).

In another example, the search component (125) executes a prediction process. For example, if a video portion has no associated position or time portions, an analysis of the position and time portions of neighboring video portions is executed. In this example, the neighboring video portions have associated position portions representing a position zzz, zzz. Next a prediction of the position portion associated with the video portion is made (for example, by reference to a rules database). In this example, the prediction of the associated position portion of that video portion is zzz, zzz.

It should be understood that the search component (125) can search all of the multimedia streams in the repository or can search according to a pre-determined factor (e.g. a time value, number of multimedia streams etc.).

In one embodiment, the multimedia streams in the repository are indexed in order to facilitate the search component (125). In one example, the multimedia streams are indexed by one type information (e.g. the multimedia streams are indexed by position or the multimedia streams are indexed by a time value etc.). In another example, the multimedia streams are indexed by two or more types of information. For example, as shown in FIG. 4, the repository (140) is indexed by position (e.g. London) and then by a time value (e.g. 2000, 2001). In yet another example, if a multimedia stream comprises two or more types of information, the multimedia stream is indexed according to one of the two or more types of second portion. It should be understood that multi-dimensional indexing methods can also be used.

Referring to the embodiment of the process of the present invention, next, the search component (125) then passes information comprising the multimedia streams and the portions of the first track found to the collation component (130). In this example, the information comprises: Multimedia stream 200, portions 202 and 208; Multimedia stream 228, portions 232 and 240.

Figure 5:
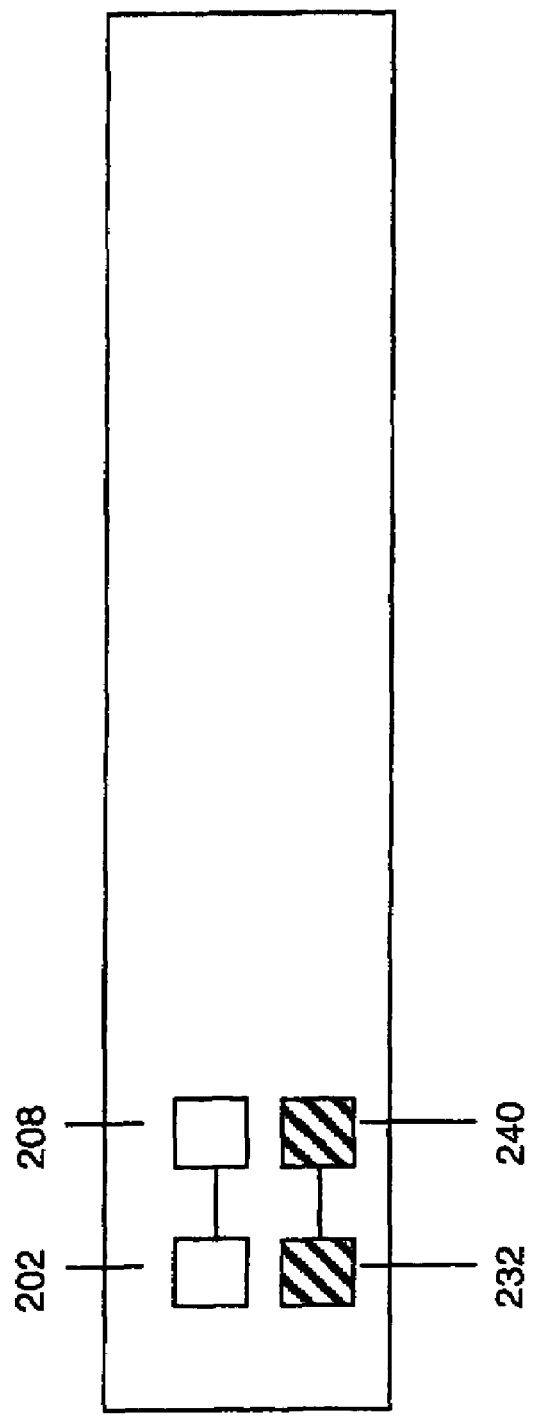
FIG. 5 is an overview of a new multimedia stream, generated from collated portions of the tracks in FIG. 2A and FIG. 2B.

Next, the collation component (130) extracts portions 202 and 208 from multimedia stream 200 and portions 232 and 240 from multimedia stream 228. Once the portions have been extracted, the collation component (130) collates the extracted portions and generates a new multimedia stream (500) comprising the extracted portions, as shown in FIG. 5.

In one example, the collation component (130) comprises an overlay component, to overlay the extracted portions of one multimedia stream with the extracted portions of another multimedia stream. In another example, the collation component (130) comprises a concatenation component, in order to concatenate the extracted portions of at least two multimedia streams. In yet another example, the collation component (130) comprises an interleave component, in order to interleave extracted portions of one multimedia stream with the extracted portions of another multimedia stream.

In this example, the collation component (130) comprises an overlay component which overlays the extracted portions of the video track with the extracted portions of the audio track, so that a user will see two portions of video and hear two portions of audio simultaneously.

It should be understood, that although in the example, portions of first tracks in each multimedia stream (200, 228) have been collated, each entire first track (i.e. all portions of each first track) can also be collated.

The new multimedia stream (500) is then sent by the send component (135) to the client system (105). Next, the client system (105) plays back the multimedia stream (500) via the playback component (110), which plays back two portions of video of the Taj Mahal taken in 1998 and two portions of audio (e.g. crowd sounds, traffic noise etc.) that was recorded in 1998 at the Taj Mahal. It should be understood that it is not the individual portions (or individual entire tracks) of audio and video that are sent back but a new multimedia stream of extracted portions of first tracks (or extracted entire first tracks). The present invention therefore provides a means for adding value to existing tracks of multimedia streams by generating new multimedia streams.

It should be understood that although in this example, all of the found portions of first tracks are collated, in another example, the portions of the first tracks and/or entire first tracks found can be presented to the user as a list of options. The user then selects portions and/or tracks from the list of options. The system comprises means for receiving an input comprising the selected options and means for passing the input to the collation component (130) for collation. Optionally, the list of options can be ordered (e.g. according to size, accuracy of matching portions and/or tracks found etc).

The present invention is preferably embodied as a computer program product for use with a computer system. Such an implementation may comprise a series of computer readable instructions either fixed on a tangible medium, such as a computer readable media, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

The invention claimed is:

1. A method of preparing a first multimedia stream, for use with an environment comprising a multimedia track repository for storing a plurality of tracks, wherein each track is associated with at least one second multimedia stream, the method comprising:

receiving a request, from a requesting device, comprising an associated geographical location parameter;

searching the multimedia track repository based on the geographical location parameter, wherein the plurality of tracks in the multimedia track repository comprise position portions in which portions of the tracks are associated with geographical location information;

determining at least two portions of the plurality of tracks associated with the geographical location parameter by comparing position information for portions of the plurality of tracks to the geographical location parameter and selecting the at least two portions of the plurality of tracks as portions of the plurality of tracks whose associated geographical location information matches the geographical location parameter within a specified geographical range;

in response to the determining the at least two portions of the plurality of tracks, collating the determined at least two portions of the plurality of tracks in order to generate the first multimedia stream; and returning the first multimedia stream to the requesting device, wherein the requesting device outputs the first multimedia stream, and wherein determining the at least two portions of the plurality of tracks comprises:

generating, for each track in the plurality of tracks, a first bounding volume based on the position information for portions of the track, comparing the geographical location parameter to geographical location information associated with the first bounding volume to determine if the geographical location parameter is within the bounding volume or within the specified geographical range of the bounding volume, and in response to the geographical location parameter being within the bounding volume:

iteratively generating at least one second bounding volume based on geographical location information for at least two of the portions of the track, iteratively comparing the geographical location parameter to geographical location information associated with the at least one second bounding volume to determine if the geographical location parameter is within the at least one second bounding volume, and returning portions of the track within the at least one second bounding volume as results of determining the at least two portions of the plurality of tracks.

* * * * *